Patented Apr. 14, 1953

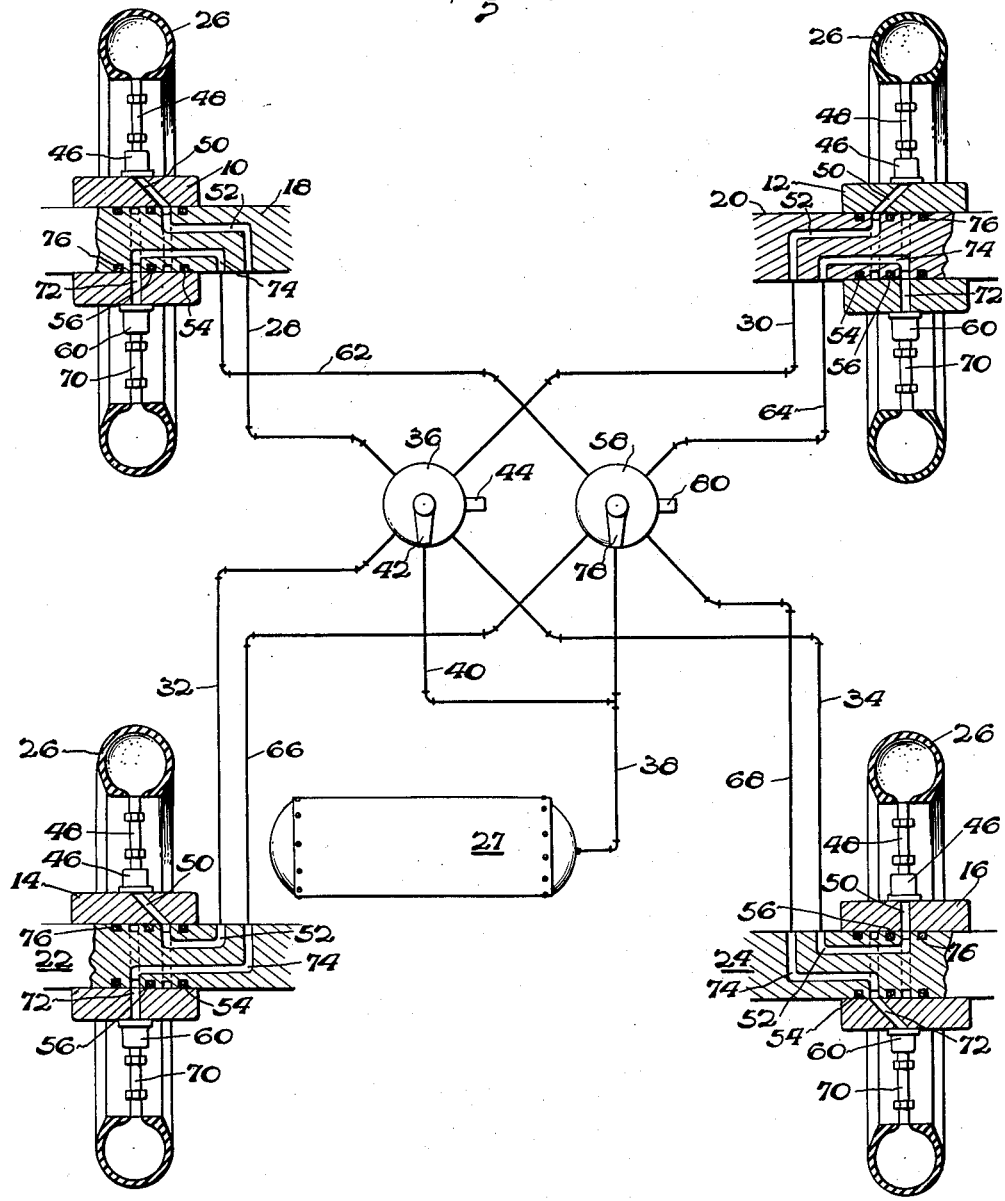

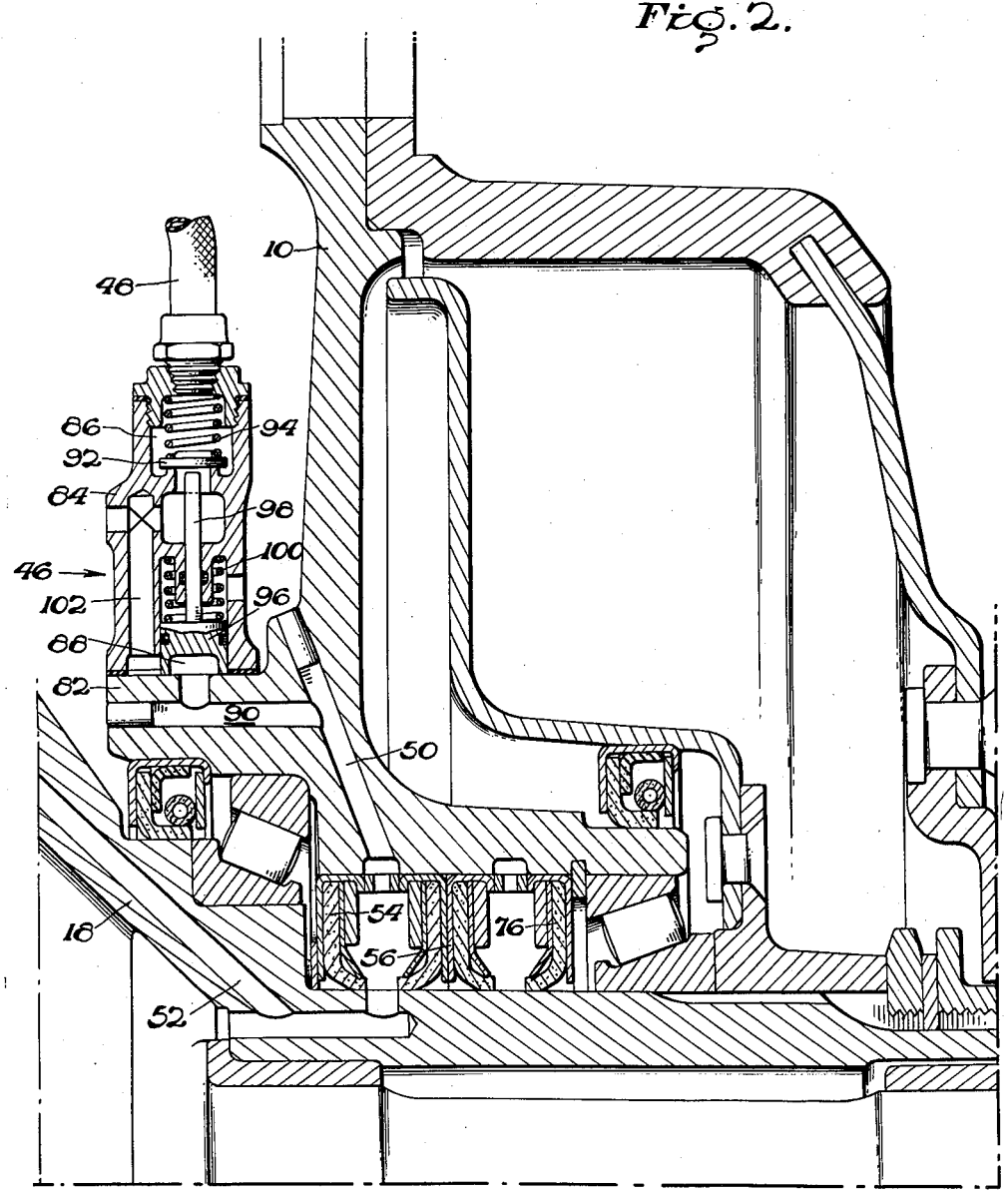

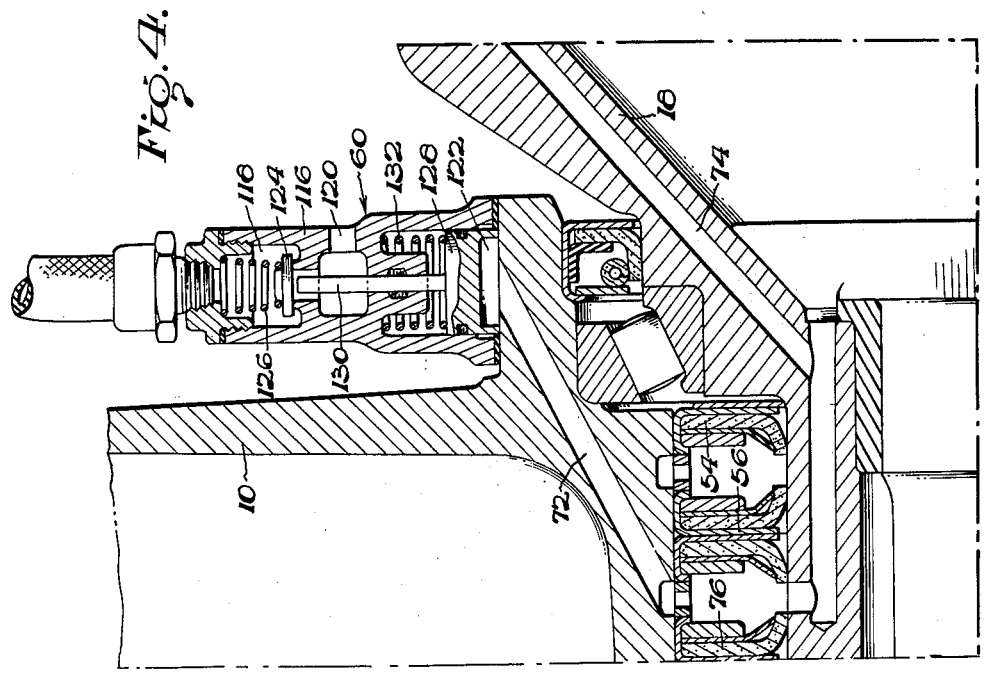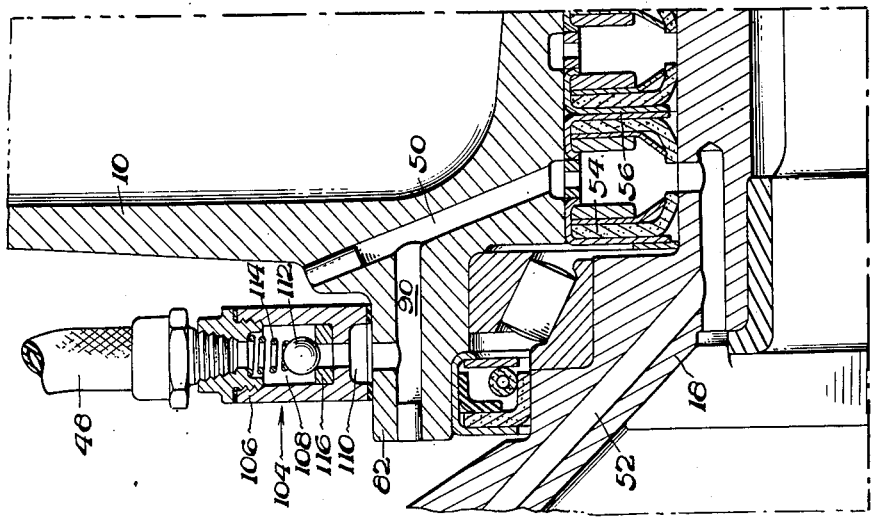

2,634,782

UNITED STATES PATENT OFFICE 2,634,782

TIRE INFLATION CONTROL SYSTEM

Thomas J. Turek, Berkeley, Calif., and Rowland Van Dyke Firth, Sr., Elyria, Ohio, assignors to Bendix-Westinghouse Automotive Air Brake Company, Elyria, Ohio, a corporation of Delaware Application October 30, 1950, Serial No. 192,889

6 Claims. (Cl. 152—417)

This invention relates to tire inflation systems and more particularly to an arrangement wherein the inflation pressures of the vehicle tires may be readily varied during operation of the vehicle.

Heretofore, various types of systems have been proposed wherein the inflation pressures of vehicle tires have been controllable while the vehicle is in operation. In constructions of this type, it is necessary to utilize a running joint or gland in order to supply compressed air from a source carried by the vehicle, to the rotating tires, and various constructions have been utilized in order to decrease the wear on the rotary seals which are required to be used with such running joints. Furthermore, in order to provide a universal system, it is desirable to include some arrangement whereby the tire inflation pressures may be reduced while the vehicle is in operation, and various arrangements have been designed to accomplish this result. The present invention is directed to an improved system of the foregoing type and the principal object thereof is to provide a simplified construction wherein the pressures in the tires may be readily increased or decreased at the will of the operator and while the vehicle is in operation.

Another object of the invention is to provide a novel tire inflation control system which includes a highly effective valve arrangement for increasing or decreasing the tire pressures, the valves being carried by the vehicle wheels and being structurally separate and positioned in such a manner as to insure proper weight balance of the wheels.

A further object is to provide in a system of the foregoing character, a novel construction which employs separate inflating and deflating valve devices, the arrangement being such that the operator may quickly control the pressures in all of the tires by merely manipulating one or the other of a pair of master selector valves, the latter being mounted in a location which is readily accessible to the operator.

A still further object comprehends a novel system wherein the running joints or glands for conducting compressed air from the non-rotatable portions of the vehicle to the rotating tires are materially simplified and provision is made for relieving the air pressure acting on these joints after the tires have been inflated or deflated to the desired pressures, thus avoiding undue wear of the seals associated with these glands.

Still another object is to provide in a system of the above type, an arrangement for affording a rapid deflation of the vehicle tires, this being accomplished by positioning the exhaust valves at the wheels of the vehicle.

Further objects and features of novelty of the invention will appear more fully hereinafter from a consideration of the following detailed description when taken in connection with the accompanying drawings illustrating the invention. It is to be expressly understood, however, that the drawings are utilized for purposes of illustration only and are not to be taken as a definition of the limits of the invention, reference being had for this purpose to the appended claims.

In the drawings, wherein similar reference characters refer to similar parts throughout the several views:

Fig. 1 is a diagrammatic view, partly in section, of a tire inflation control system constructed in accordance with the principles of the present invention;

Fig. 2 is an axial sectional view of a portion of a vehicle wheel and mounting therefor, and illustrates one form of inflation valve which may be employed;

Fig. 3 is a view similar to Fig. 2 but illustrates another form of inflation valve which may be utilized in the system; and Fig. 4 is an axial sectional view of a portion of a vehicle wheel and mounting therefor, and illustrates in detail, the deflation valve which is incorporated in the system.

Referring more particularly to Fig. 1, the present invention is illustrated therein as including a plurality of vehicle wheels 10, 12, 14 and 16 which are respectively mounted upon suitable vehicle support members 18, 20, 22 and 24, each of the wheels being provided with a pneumatic tire 26 of well known construction.

In order to provide for the inflation pressure control of each of the pneumatic tires, the invention includes a reservoir 27 which is adapted to supply compressed air to the tires 26 and the support members 18, 20, 22 and 24 by way of conduits 28, 30, 32 and 34, the latter conduits being connected to an outlet chamber of a master selector feed valve 36 to which compressed air is supplied from the reservoir 27, as by means of conduits 38 and 40. The master feed valve 36 may be of any well known construction and includes a rotatable member 42 which may be manually adjusted by the operator to any desired position as to conduct a predetermined pressure to its outlet chamber and thence to the tires, depending upon the setting of the valve. Also the valve 36 is so constituted that it may be adjusted to an exhaust position where the conduit 40 is closed and the conduits 28, 30, 32 and 34 are all connected with an atmospheric port 44. Valves of this type are usually termed feed valves or pressure limiting valves, and since they are well known in the art, further description thereof is not deemed to be necessary.

Means are provided for conducting compressed air from the conduits 28, 30, 32 and 34 to the tires 26, and as shown, such means includes an inflation valve 46 carried by each of the wheels 10, 12, 14 and 16, and provided with an outlet conduit 48 and an inlet conduit 50. More particularly, the inlet conduits 50 are connected with the conduits 28, 30, 32 and 34 by passages 52 formed in the stationary parts 18, 20, 22 and 24, this construction providing a running joint or gland which assures that the conduits 50 will be connected at all times with the conduits 28, 30, 32 and 34. Suitable rotary seals 54 and 56 are provided between the relatively rotatable parts of the running joints in order to prevent leakage of air therefrom when the conduits 28, 30, 32 and 34 are charged with compressed air.

The present invention provides a novel arrangement for reducing the pressures in the tires 26 at the will of the operator which includes a master deflating control valve 58 adapted to supply compressed air from the reservoir 27 to a deflating valve 60, carried by each of the wheels, as by means of conduits 62, 64, 66 and 68. In order to secure proper wheel balance, the deflating valves 60 are positioned diametrically opposite from the inflating valves 46, and as shown, are provided with outlet conduits 70 connected with the tires 26, as well as inlet conduits 72 connected with passages 74 formed in the stationary parts 18, 20, 22 and 24. Here again, a running joint or gland is provided between the stationary parts 18, 20, 22 and 24, and the wheels 10, 12, 14 and 16 in order to assure that the passages 74 will be connected at all times with the inlet conduits 72, and the seal between the relatively rotatable parts is provided by the rotary seal 56 and a rotary seal 76. The deflating control valve 58 is of the well known type which may be moved by an operating handle 78 to one of two positions, the first position serving to connect the conduits 62, 64, 66 and 68 with the supply conduit 38, and the second position serving to shut off the supply conduit 38 and connect the conduits 62, 64, 66 and 68 with an atmospheric connection 80. In this manner, the deflating valves 60 may be either charged with fluid pressure or connected with atmosphere. From the description which is set forth in detail hereinafter, it will be understood that when it is desired to reduce the pressures in the tires, the valve 58 is moved to the charging position to charge the conduits 62, 64, 66 and 68 with compressed air. Thereafter, the valve 58 is moved to its "off" or "exhaust" position whereupon the rotary seals 56 and 76 will be relieved from air pressure acting thereon.

Referring now to Fig. 2, the inflation valve 46 is suitably secured to a part 82 of the wheel 10 and includes a casing 84 provided with an outlet chamber 86 and an inlet chamber 88, respectively communicating with the tire 26 through the outlet conduit 48 and with the inlet conduit 50 by way of a passage 90. A check valve 92 is positioned within the outlet chamber 86 and is normally urged to the closed position illustrated, as by means of a spring 94. In this position, the check valve 92 prevents any passage of compressed air out of the tire 26. In order to open the check valve 92 and charge the tire, a pressure responsive member 96 is slidably arranged within the casing 84 and is provided with a plunger 98 adapted to contact the check valve 92 and move the latter to an open position when the member 96 is moved against the pressure of a return spring 100. When this action occurs, the chambers 86 and 88 will be interconnected through a passage 102 so that compressed air may be conducted to the tire 26 by way of the passage 52, inlet conduit 50, passage 90, inlet chamber 88, passage 102, outlet chamber 86 and outlet conduit 48. It will be understood that due to the construction of the member 96, the check valve 92 will be opened upon the admission of the preselected pressure to the inlet chamber 88, regardless of the pressure present in the tire.

A modified form of inflation valve 104 is illustrated in Fig. 3 and includes a casing 106 having outlet and inlet chambers 108 and 110 respectively. In this form of the invention, a ball check valve 112 is resiliently urged by a spring 114 to a seat 116 and normally serves to prevent flow of air from the tire to the inlet chamber 110. It will be understood from this construction that when compressed air is admitted to the passage 90, the check valve 112 will open at some pressure slightly higher than the pressure within the tire in order to connect the chambers 110 and 108 and thus charge the tire to the pressure selected by the operation of the feed valve 36.

In order to reduce the pressures in the tires at any time, the deflating control valve 58 is operated to charge the conduits 62, 64, 66 and 68 with compressed air from the reservoir 27, so as to conduct compressed air through these conduits to the passages 74 and the inlet conduits 72 of the wheel-mounted deflation valves 60. Referring more particularly to Fig. 4, the latter valves include a casing 116 provided with outlet, exhaust and inlet chambers 118, 120 and 122 respectively, communication between the outlet and exhaust chambers being normally prevented by a check valve 124 and its associated spring 126. However, as soon as compressed air is admitted to the inlet chamber 122, through operation of the deflating control valve 58 to its operative or "on" position, the check valve 124 will be opened, regardless of the pressure within the tire 26, through movement of a pressure responsive member 128 and associated plunger 130 against the action of return spring 132. As soon as the tire pressures have been lowered sufficiently, the control valve 58 is moved to its "off" position to exhaust the inlet chamber 122 and allow the return of the parts to the positions illustrated in Fig. 4. Thereafter, it is only necessary to adjust the feed valve 36 to the new pressure desired and to charge the tires in the manner previously set forth. As soon as the charging cycle has been effected, the feed valve may be moved to its "exhaust" or "off" position to exhaust all of the conduits 28, 30, 32 and 34. The rotary seals 54, 56 and 76 will thereupon be relieved of compressed air acting thereon, and their life will accordingly be greatly lengthened.

In operation, and with the parts occupying the positions illustrated, it is only necessary for the operator to set the feed valve 36 at the desired inflation pressure in order to cause an automatic inflation of all the vehicle tires. As soon as the valve 36 is set, as stated, compressed air will be conducted to all of the tires 26 by way of conduits 28, 30, 32 and 34. In the case of the inflation valves of the type shown in Fig. 2, air will be conducted to the inlet chamber 88 by way of passage 52, inlet conduit 50 and passage 90. Air pressure acting on the pressure responsive member 96 will move the latter upwardly, as viewed in Fig. 2, to open the check valve 92 and connect the tire 26 with the inlet chamber 88 by way of passage 102, outlet chamber 86 and outlet conduit 48. As soon as the tires have been inflated to the predetermined value, the feed valve is moved to exhaust the conduits 28, 30, 32 and 34 in order to permit the check valves 92 to close and retain the air pressure in the tires. With the exhausting of the aforementioned conduits, all pressure acting on the rotary seals 54 and 56 will be relieved.

In the case of inflation valves of the type shown in Fig. 3, it will be understood that the action thereof is similar to Fig. 2 except that the check valve 112 will not open until the pressure in the inlet chamber 110 is above the tire pressure. When this condition is reached, the tire is charged through the open valve 112, the latter closing as soon as the tire pressure reaches the preselected value. Thereafter, the feed valve is moved to exhaust position, as in the case of Fig. 2, and the check valve 112 retains the pressure within the tires.

Should it be desired to decrease the tire pressures, the feed valve 36 may be first moved to the new position and the deflation control valve 58 may be momentarily opened and then closed to first lower the tire pressures and then exhaust the control conduits 62, 64, 66 and 68. As soon as the wheel-mounted deflation valves 60 close, the operation of the inflation valves 46 or 104 will serve to inflate the tires to the lowered pressure as determined by the setting of the feed valve 36, following which the latter is moved to exhaust position. The action of the deflation valves 60 in connecting the tires 26 to the exhaust chambers 120, when the deflation control valve 58 charges the control lines 62, 64, 66 and 68 has heretofore been described in detail.

It will be readily seen from the foregoing that the present invention provides a simple but highly effective method of controlling the inflation pressures of the vehicle tires while the vehicle is in operation and the construction is such that after the desired pressures have been reached, the feed valve may be moved to exhaust position in order to relieve the pressures acting on the rotary seals. A further feature resides in the use of separate inflation and deflation check valves which enable either an increase or a decrease in tire pressures to be quickly obtained. This latter construction also permits such an arrangement of parts as to secure effective balancing of the vehicle wheels.

While two embodiments of the invention have been shown and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. A tire inflation control system for a vehicle wheel having a pneumatic tire mounted thereon, comprising an inflation valve carried by the wheel and provided with a check valve for allowing flow of compressed air to the tire while preventing return flow thereof, a source of compressed air, means including a conduit for conducting compressed air from said source to said inflation valve to inflate the tire to a predetermined pressure, means for reducing the pressure in said tire comprising a deflation valve carried by the wheel and positioned diametrically opposite to said inflation valve, and means to actuate said deflation valve including a conduit to conduct compressed air from said source to said deflation valve.

2. A tire inflation system for a vehicle wheel having a pneumatic tire mounted thereon, comprising an inflation valve carried by the wheel and provided with a casing having an outlet chamber in constant communication with the tire, a source of compressed air, means including a conduit for conducting compressed air from said source to said outlet chamber, a spring closed check valve for preventing return flow of compressed air from said outlet chamber to said conduit, a deflation valve carried by the wheel and positioned diametrically opposite to said inflation valve, said deflation valve provided with a casing having an outlet chamber in constant communication with the tire, an exhaust chamber communicating with the atmosphere, and a spring-closed check valve normally preventing communication between the outlet and exhaust chambers, and means carried by the deflation valve casing for opening the deflation valve check valve to connect the outlet chamber thereof with the exhaust chamber to reduce the pressure in the tire.

3. A tire inflation system for a vehicle wheel having a pneumatic tire mounted thereon, comprising an inflation valve carried by the wheel and provided with a casing having an outlet chamber in constant communication with the tire, a source of compressed air, means including a conduit for conducting compressed air from said source to said outlet chamber, a spring-closed check valve for preventing return flow of compressed air from said outlet chamber to said conduit, a deflation valve carried by the wheel and positioned diametrically opposite to said inflation valve, said deflation valve provided with a casing having an outlet chamber in constant communication with the tire, an exhaust chamber communicating with the atmosphere and a spring-closed check valve normally preventing communication between the outlet and exhaust chambers, and means for reducing the pressure in the tire, comprising a fluid pressure responsive device carried by the deflation valve casing and having a part movable to open the deflation valve check valve, and means including a conduit for conducting compressed air from said source to said device.

4. A tire inflation system for a vehicle wheel having a pneumatic tire mounted thereon, comprising an inflation valve carried by the wheel and provided with a casing having an outlet chamber in constant communication with the tire, said casing also provided with an inlet chamber, a source of compressed air, conduit means connecting said source to said inlet chamber and including an operator controlled valve for controlling the pressure of the air delivered to said inlet chamber, a spring-closed check valve for preventing flow of compressed air from the outlet chamber to the inlet chamber, a fluid pressure responsive device movable in said casing in response to the pressure of the air delivered to the inlet chamber for opening said check valve to connect said inlet and outlet chambers to charge the tire, and means to reduce the pressure in the tire comprising a deflation valve carried by the wheel and positioned diametrically opposite to said inflation valve, said deflation valve provided with a casing having an outlet chamber in constant communication with the tire, an exhaust chamber communicating with the atmosphere, a spring-closed check valve normally preventing communication between the outlet and exhaust chambers, and a pressure responsive member movable to open the last named check valve to connect the tire with the exhaust chamber, and means including a valve device for subjecting the pressure responsive member to air pressure from said source.

5. In a system for controlling the pressures in the tires of a vehicle while the vehicle wheels are rotating, comprising an inflation valve mounted on each wheel and comprising a casing having a conduit communicating with the tire and having also an inlet chamber, a spring-closed check valve operative to admit compressed air from the inlet chamber to said conduit and to prevent release of compressed air therefrom, a fluid pressure operated device in said casing subject to pressures existing in said inlet chamber and movable to open said check valve to connect the inlet chamber and conduit, a source of compressed air, manually operable means to connect said source and inlet chamber, and means to reduce the pressures in the tires comprising a deflation valve mounted on each wheel and positioned diametrically opposite to the respective inflation valves, each deflation valve provided with a casing having an outlet chamber in constant communication with the tire, an exhaust chamber communicating with the atmosphere, a spring-closed check valve normally preventing communication between the outlet and exhaust chambers, and a pressure responsive member movable to open the last named check valve to connect the tire with the exhaust chamber, and means including a valve device for subjecting the pressure responsive member to air pressure from said source.

6. In a system for controlling the pressures in the tires of a vehicle while the vehicle wheels are rotating, comprising an inflation valve mounted on each wheel and comprising a casing having a conduit communicating with the tire and having also an inlet chamber, a spring-closed check valve operative to admit compressed air from the inlet chamber to said conduit and to prevent release of compressed air therefrom, a fluid pressure operated device in said casing subject to pressures existing in said inlet chamber and movable to open said check valve to connect the inlet chamber and conduit, a source of compressed air on the vehicle, conduit means connecting said source and the inlet chambers of said inflation valves and including rotary connections between the wheels and stationary parts on which the wheels are mounted, rotary seals associated with said rotary connections for preventing loss of air pressure, a manually operable valve in said conduit means for connecting said source to all of said inlet chambers to charge said tires, said valve being thereafter movable to an exhaust position to exhaust said inlet chambers and relieve the rotary seals from air pressure acting thereon, and means to reduce the pressures in the tires comprising a deflation valve mounted on each wheel and positioned diametrically opposite to the respective inflation valves, each deflation valve provided with a casing having an outlet chamber in constant communication with the tire, an exhaust chamber communicating with the atmosphere, a spring-closed check valve normally preventing communication between the outlet and exhaust chambers, and a pressure responsive member movable to open the last named check valve to connect the tire with the exhaust chamber, and means for subjecting the pressure responsive member to air pressure from said source.

THOMAS J. TUREK.
R. VAN DYKE FIRTH, Sr.

References Cited in the file of this patent
UNITED STATES PATENTS

| Number | Name | Date |
|---|---|---|
| 1,128,455 | Keith | Feb. 16, 1915 |
| 1,338,337 | Stonestreet | Apr. 27, 1920 |
| 2,213,539 | Wiegand | Sept. 3, 1940 |